United States Patent
Baur et al.

(10) Patent No.: US 10,949,529 B2
(45) Date of Patent: Mar. 16, 2021

(54) PROCESSING UNIT AND METHOD FOR OPERATING A PROCESSING UNIT

(71) Applicant: Robert Bosch GmbH, Stuttgart (DE)

(72) Inventors: Heiko Baur, Goeppingen (DE); Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 15/971,702

(22) Filed: May 4, 2018

(65) Prior Publication Data

US 2018/0336341 A1 Nov. 22, 2018

(30) Foreign Application Priority Data

May 16, 2017 (DE) .......................... 102017208192.9

(51) Int. Cl.
| | | |
|---|---|---|
| *G06F 21/00* | (2013.01) | |
| *G06F 11/36* | (2006.01) | |
| *G06F 21/52* | (2013.01) | |
| *G06F 21/55* | (2013.01) | |
| *G06F 21/56* | (2013.01) | |
| *G06F 11/28* | (2006.01) | |

(52) U.S. Cl.
CPC ............ *G06F 21/52* (2013.01); *G06F 21/552* (2013.01); *G06F 21/566* (2013.01); *G06F 2221/033* (2013.01)

(58) Field of Classification Search
CPC .. G06F 2221/033; G06F 21/52; G06F 21/552; G06F 21/566
See application file for complete search history.

(56) References Cited

U.S. PATENT DOCUMENTS

| | | | | |
|---|---|---|---|---|
| 5,440,723 A | * | 8/1995 | Arnold | G06F 21/564 714/2 |
| 10,607,011 B1 | * | 3/2020 | Orhan | G06F 21/566 |
| 2004/0163079 A1 | * | 8/2004 | Noy | G06F 11/3409 717/154 |
| 2009/0193496 A1 | * | 7/2009 | Lakshminarayanan | G06F 9/455 726/1 |
| 2009/0320133 A1 | * | 12/2009 | Viljoen | G06F 21/564 726/24 |
| 2010/0262864 A1 | * | 10/2010 | Tsujido | G06F 11/27 714/32 |
| 2011/0185230 A1 | * | 7/2011 | Agrawal | G06N 20/00 714/26 |
| 2014/0041031 A1 | * | 2/2014 | Prowell | G06F 21/566 726/23 |
| 2015/0150084 A1 | * | 5/2015 | Kiperberg | G06F 21/44 726/3 |
| 2016/0085607 A1 | * | 3/2016 | Marr | G06F 11/3006 714/37 |
| 2017/0220448 A1 | * | 8/2017 | Topiwala | G06F 11/362 |
| 2017/0294054 A1 | * | 10/2017 | Rosenbaum | F02D 41/2406 |

* cited by examiner

*Primary Examiner* — Michael Simitoski
(74) *Attorney, Agent, or Firm* — Norton Rose Fulbright US LLP; Gerard Messina

(57) ABSTRACT

A processing unit is configured to carry out at least one program function of a computer program, ascertain the execution time of the program function, and compare the ascertained execution time to a setpoint value to identify a software attack.

8 Claims, 2 Drawing Sheets

PROCESSING UNIT AND METHOD FOR OPERATING A PROCESSING UNIT

CROSS-REFERENCE TO RELATED APPLICATIONS

The present application claims priority under 35 U.S.C. § 119 to DE 10 2017 208 192.9, filed in the Federal Republic of Germany on May 16, 2017, the content of which is hereby incorporated by reference herein in its entirety.

FIELD OF THE INVENTION

The present invention relates to a processing unit configured to carry out at least one program function of a computer program executable on the processing unit. The present invention further relates to a method for operating such a processing unit.

BACKGROUND

Processing units and operation methods are known. A program function of a computer program executable on the processing unit can be, for example, part of a machine program assigned to the processing unit. Alternatively, or in addition, it is possible for program functions of the computer program executable on the processing unit to be part of system libraries (libc, "stdio.h," etc.) or standard libraries, which are pre-installed on known processing units, for example, together with an operating system or, in general, a runtime environment, which means that when new computer programs are deployed for the processing unit, these program functions do not have to be provided separately on it.

It is known that attacks on existing implementations are possible, such that existing program functions, which are, for example, part of system libraries or standard libraries, are exchanged for manipulated program functions, which contain malicious code and the like in addition to the regular functionality of the existing program functions. In this manner, the manipulated program functions are moved, so to speak, into a man-in-the-middle attack position, which allows them to manipulate system calls and/or program function calls from application programs running on the processing unit and/or to change and/or copy their output and/or return values and possibly transmit them to an unauthorized receiver.

SUMMARY

Accordingly, an object of the present invention is to improve a processing unit and an operational method, to increase reliability and safety from the above-mentioned attacks.

In the case of the processing unit, this object of the present invention is achieved by configuring the processing unit to ascertain the execution time of the program function and to compare it to at least one setpoint value for the execution time of the program function.

According to the present invention, it has been recognized that a multitude of program functions have a substantially deterministic, thus, predictable, and/or even constant execution time. This applies, in particular, to program functions of standard libraries and so-called system calls, in which, for example, functionality, which is provided by an operating system and is in the form of the program function, is implemented after a corresponding call by an application program. In particular, this is true in so-called embedded systems. According to the present invention, the execution time of this program function can be ascertained and compared to at least one setpoint value for the execution time. This advantageously allows one to determine whether, or to what extent, an actual execution time of the program function in question differs from the setpoint value, which can be evaluated as an indication of the presence of a manipulation of and/or an attack on the processing unit and/or the program functions and/or the corresponding runtime environment.

In an example embodiment, the execution time is a time lag between the time of calling the program function and the time of returning from the called program function. In an example embodiment, an application program, which carries out the program function in question and/or system call, measures this time lag and compares it to the setpoint value as an actual execution time.

In an example embodiment, an error response is carried out by the processing unit if the ascertained execution time differs from the setpoint value by a predetermined differential value, e.g., exceeds the setpoint value by the differential value. In this case, for example, it can be deduced that the called program function is executing impermissibly and/or that there are additional program runs. Alternatively, or in addition, an error response can also be initiated if the ascertained execution time falls below a corresponding, second setpoint value for a minimum execution time by a specifiable degree. In this case, as well, a manipulation of the type mentioned above can be present.

In an example embodiment, the error response includes at least one of the following steps: process and/or write specifiable data, in particular, dummy data (for example, data having a low information content and/or (pseudo)random data); and notify another unit about an irregular execution time of the program function. In this manner, on one hand, an active attack on valuable payload data can be prevented, and on the other hand, e.g., countermeasures and/or a detailed investigation of the suspicious program function can be initiated by the other unit.

In an example embodiment, the processing unit is configured to execute the program function several times and to ascertain a minimum execution time and/or maximum execution time and/or mean execution time of the program function in question. In a manner analogous to the example embodiments mentioned above, the minimum execution time and/or the maximum execution time and/or the mean execution time can also be compared to corresponding setpoint values, and in the event of a difference from at least one of the possible plurality of setpoint values, an appropriate error response can be initiated.

In an example embodiment, the program function is executed several times with the same parameters, in order to ensure that different execution times are not caused by the transfer of different parameters.

In an example embodiment, setpoint values of different magnitudes are provided for evaluating the actual execution time; the setpoint values of different magnitudes being selected, in particular, as a function of a type of program function in question and/or of the system call in question (for example, number of parameters).

Further aspects of the present invention relate to a method for providing program functions for a target system, where the method includes: providing a program function of a computer program executable on the target system; ascertaining information characterizing an execution time of the program function on the target system; at least temporarily storing the information characterizing the execution time of the program function on the target system and/or information derived from it.

In an example embodiment, the provided program function can be run on a reference target system, thereby allowing the execution time of the program function to be ascertained accurately. In an example embodiment, the information characterizing the execution time of the program function on the target system and/or the information derived from it is transmitted to the target system. In this manner, the respective information can be made available efficiently to the target system, which can use the information, for example, regarding the running time. In particular, the information provided in this manner can be used to form setpoint values for the above-mentioned comparison with actual execution times of the program functions.

A further aspect of the present invention is directed to a device for providing program functions for a target system.

Additional features, uses, and advantages of the present invention are derived from the following description of exemplary embodiments of the present invention, which are represented in the figures of the drawing. In this context, all of the features described or depicted form the subject of the present invention, either alone or in any combination, irrespective of their combination in the patent claims or their antecedent references, as well as irrespective of their wording and representation in the description and in the drawing, respectively.

DETAILED DESCRIPTION

Figure 1:
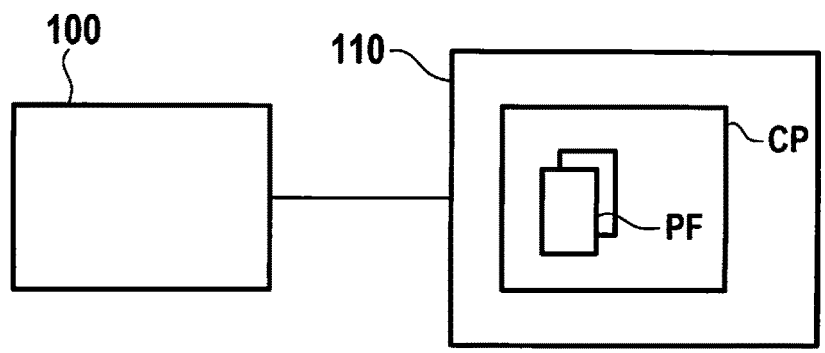
FIG. 1 is a block diagram of a processing unit according to an example embodiment of the present invention.

FIG. 1 shows schematically a block diagram of an example embodiment of a processing unit 100, which is assigned a storage device 110 for at least temporarily storing a computer program CP executable on processing unit 100. Computer program CP can include one or more program functions PF, of which, for the sake of clarity, only one is presently denoted. The storage device can include, e.g., a volatile memory, e.g., a working memory (RAM), or a nonvolatile memory, as well as combinations of these.

Program function PF can be a program function PF, which is integrated into an application program, for example, computer program CP. For example, program function PF, together with the application program or computer program CP, can be supplied to processing unit 100, for example, in machine-readable form, e.g., in the form of a binary file.

Alternatively, or in addition, program function PF can also be a program function of a standard library or a so-called system call of a runtime environment provided for the operation of processing unit 100. In these cases, the program function in question can, for example, also be pre-installed already on processing unit 100, for example, as a part of an operating system and/or of the runtime environment.

Figure 2:
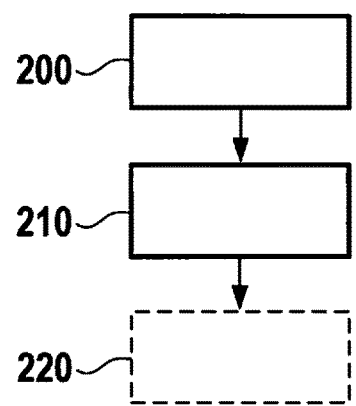
FIG. 2 is a flowchart of a method for operating a processing unit according to an example embodiment of the present invention.

According to the present invention, it is provided that processing unit 100 ascertain the execution time of program function PF, cf. step 200 of the flowchart from FIG. 2, and that processing unit 100 (FIG. 1) compare the execution time ascertained in step 200 to at least one setpoint value for the execution time, cf. step 210 according to FIG. 2. This allows processing unit 100 to determine if the execution time actually ascertained is, for example, comparatively long in comparison with the setpoint value, from which a case of an error and/or an attempted attack on the program function and/or on processing unit 100 can be deduced.

In particular, in an example embodiment, an error response is carried out, cf. optional step 220 according to FIG. 2, if the ascertained execution time exceeds the setpoint value by a predetermined differential value. Error response 220 can include, for example, the processing and/or writing of specifiable dummy data or pseudo-random data or random data, as well as, alternatively or additionally, notification of another unit (not shown) about the irregular execution time of program function PF. In further example embodiments, deactivation of processing unit 100 and/or of computer program CP can be provided, as well, in order to prevent repeated execution of possibly compromised program function PF in response to a detected attack attempt.

In one further example embodiment, processing unit 100 can be configured to execute program function PF (FIG. 1) several times and to ascertain a minimum execution time and/or a maximum execution time and/or a mean execution time; at least one of these values being able to be compared to a corresponding setpoint value.

Figure 4:
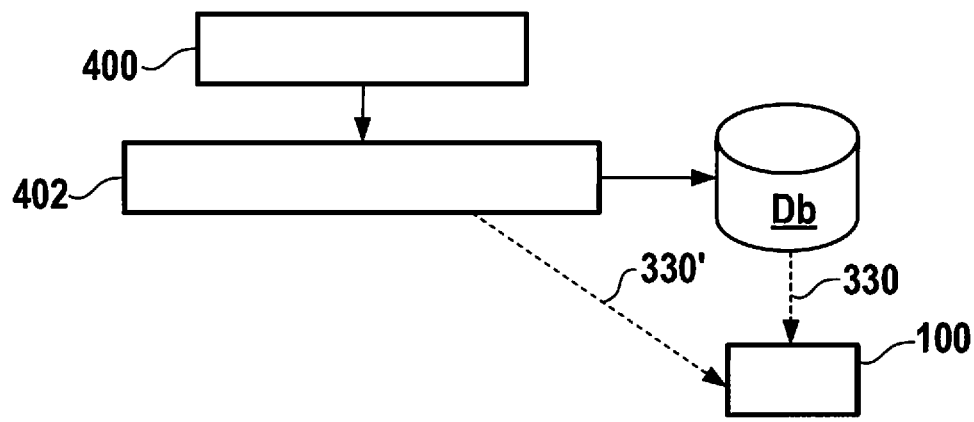
FIG. 4 illustrates an operating scenario according to an example embodiment of the present invention.

FIG. 4 shows schematically an operating scenario according to one example embodiment. Reference numeral 400 denotes a runtime environment, which, for example, is characterized by a specifiable type of processing unit 100 as a target system for a computer program CP, which is intended to be able to provide and/or call program function PF (FIG. 1); by an operating system; and/or by program libraries, which supply the callable program functions. Based on runtime environment 400, one or more measurements of the execution time of the program function PF of interest are made, which is indicated by block 402 in FIG. 4.

The values for the execution time obtained in this case are preferably stored at least temporarily in a database Db. Optionally, the values obtained in this case can then be transmitted to target system 100, as well, cf. arrow 330 in FIG. 4. In an alternative example embodiment, the values obtained for the execution time can also be made available to target system 100 immediately after measurement 402, cf. arrow 330'.

Above-mentioned measurement 402 can advantageously be made, for example, during a production phase or design phase, in which processing unit 100 and/or its computer program CP is designed and/or programmed and/or manufactured. The measured values described above can then be stored in database Db and transmitted to target systems 100, as required, cf. arrows 330, 330'. The transmission can take place, for example, upon completion of processing unit 100, and thus, before it, for its part, is deployed in the field in a target system.

For example, processing unit 100 can be a processing unit for a control unit of a motor vehicle. In this case, processing unit 100 can be provided with the above-described, measured values regarding the execution time of at least one program function PF, before it is integrated into the control unit and/or into the motor vehicle. Later, for example, in the field, processing unit 100 of the present invention can then advantageously use the data, which is transmitted to it, as described above, and concerns the measured execution time of program function PF, for the comparison 210 (FIG. 2) also described above, in order to be able to detect attacks on processing unit 100 and/or on its runtime environment.

Figure 5:
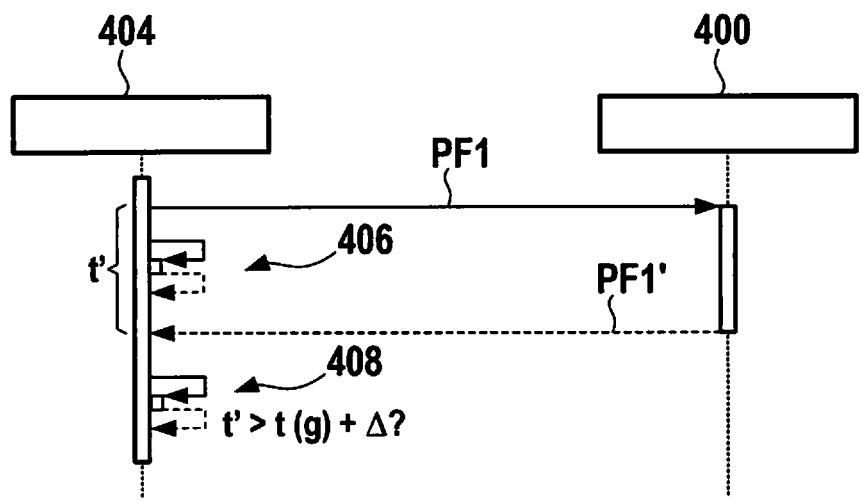
FIG. 5 illustrates another operating scenario according to an example embodiment of the present invention.

FIG. 5 shows schematically an operating scenario according to a further example embodiment. Reference numeral 400 indicates a runtime environment again, and reference numeral 404 presently denotes an application program, for example, a so-called user-level application. A user-level application is an application program, which runs on the user level, in contrast to, for example, kernel-level threads, i.e., processes or threads, which run on the kernel level.

Arrow PF1 denotes a call of program function PF (FIG. 1) by application program 404, and arrow PF1' denotes a return from program function PF to application program 404 after the execution of program function PF. The execution time is denoted by reference character t' and is presently ascertained by application program 404 on the basis of the principle according to present invention, cf. reference numeral 406. Then, as indicated by reference numeral 408, ascertained, actual execution time t' is compared to a specifiable setpoint value t(g)+Δ, in order to be able to detect a possible attack on and/or a possible manipulation of program function PF1 and/or runtime environment 400.

Figure 6:
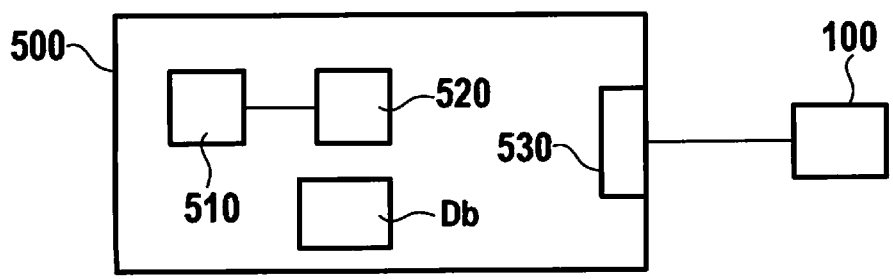
FIG. 6 is a block diagram of a device for providing program functions according to an example embodiment of the present invention.

FIG. 6 schematically shows a block diagram of a device 500 of the present invention for providing program functions. Device 500 includes a processor core 510, as well as an associated storage device 520. Device 500 is configured to implement the method illustrated by the flowchart according to FIG. 3. In a first step 300, a program function of a computer program executable on target system 100 is provided. In this connection, it can be a program function, in which the execution time is intended to be ascertained in the future in the target system, that is, e.g., in the processing unit 100 according to FIG. 1, and possibly compared to a setpoint value.

Figure 3:
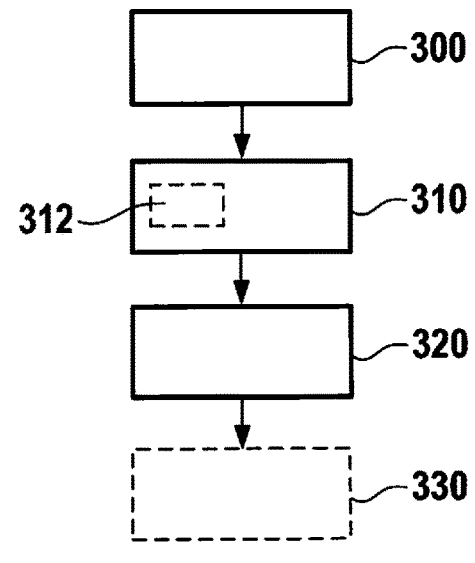
FIG. 3 is a flowchart of a method for providing program functions according to an example embodiment of the present invention.

In step 310 of the method according to FIG. 3, device 500 (FIG. 6) ascertains information, which characterizes an execution time of program function PF on target system 100. This can be accomplished, for example, by executing 312 program function PF on a reference target system, which is configured to be comparatively similar or identical to target system 100 with regard to hardware and/or software. In step 320, this information, which characterizes an execution time of program function PF on target system 100, and/or information derived from it, is stored at least temporarily, for example, in database Db, cf. FIG. 5.

In an optional step 330, the information characterizing the execution time of program function PF can also be transmitted to target system 100. To this end, device 500 can have a suitable interface 530. Device 500 can be used, for example, during a manufacturing process of processing unit 100 and/or during development of computer programs CP for processing unit 100.

Below, source code, which is of a computer program written in the C computer language, and is for illustrating aspects of the example embodiments, is reproduced as "Listing 1," by way of example. The individual lines of code of Listing 1 are preceded by line numbers, in this case, 1-65, in order to simplify a subsequent explanation and referencing of the source code.

In lines 38-44 of Listing 1, a loop is defined, which provides 20 repetitions of the execution of a program function "fopen( )" (opening of a file) of the standard library stdio.h, including measurement of the execution time for this program function "fopen( )." The time measurement is carried out, using the expression START( ) in line 40 of Listing 1, for this, cf. the definition from line 24 as well, and using the expression STOP( ) in line 42, for this, cf. the definition from line 27 of Listing 1 as well.

Then, with the aid of lines 47-55 of Listing 1, the five highest and the five lowest of the total of 20 measured values for the execution time of program function "fopen( )" are deleted. Subsequently, with the aid of lines 56-60, an evaluation is made on this matter, as to whether the ascertained execution time is greater than a specifiable threshold value (presently, for example, the value of 170000).

Therefore, Listing 1 advantageously allows the use of the principle according to the present invention. A corresponding source code can be integrated, for example, into one or more application programs and/or computer programs CP, which are provided for execution on processing unit 100. Of course, the above-mentioned reference or time measurement with regard to program function "fopen( )" was selected only by way of example and is applicable to one or more other program functions, in particular, system calls, as well.

Below, source code, which is of a computer program written in the C computer language, as well, and is for illustrating further aspects of example embodiments, is reproduced as "Listing 2," by way of example. The individual lines of code of Listing 2 are preceded by line numbers, in this case, 1-101, in order to simplify a subsequent explanation and referencing of the source code.

Listing 2 carries out, for example, a comparison of the execution times of program function "strcmp( )" (comparison of character strings) of standard library "libc" and/or "stdio.h," with the execution times of an exemplarily provided, separate implementation of a function for comparing character strings, "internal_strcmp( )," cf. lines 21-26. The execution time of the program function of the standard library is ascertained in the loop in lines 49-54, and the execution time of the separate implementation is ascertained in the loop in lines 70-76, in each instance, with 20 repetitions again. As already described above with reference to Listing 1, in each instance, 10 extreme values of the 20 repetitions are discarded, cf. lines 56-66 and 77-87. An evaluation of the remaining execution times is presently carried out in lines 92-99.

Implementations of example embodiments of the present invention advantageously allow application programs CP and/or associated runtime environments to be protected from manipulations of program functions, as are contained, for example, in standard libraries (e.g., libc and/or "stdio.h," etc.). In this manner, in particular, comparatively new malware of the root-kit type can also be combatted; this malware attempting to "capture" the established standard libraries from runtime environments and to replace the program functions PF contained therein, which are called, for example, by application software CP, with manipulated versions of such program functions. Since such manipulated versions generally have a run time or execution time significantly different from the original versions, such manipulation can be detected efficiently, using the principle of the present invention.

In general, example embodiments of the present invention permit the detection of attacks on program functions and/or corresponding runtime environments, in which manipulations of input data and/or output data occur during the calling of the program function and/or the return of the output data, for example, in the manner of a man-in-the-middle attack. In particular, application programs and/or computer programs, which could possibly access manipulated program functions and/or libraries, can be protected. The present invention advantageously makes use of the fact that in many cases, the physical behavior, in particular, the execution time, of a manipulated program function and/or runtime environment, is not be masked in a practical manner.

In example embodiments, processing unit 100 can be, for example, a processing unit of an embedded system, or also a processing unit (e.g., CPU, processor, microcontroller, digital signal processor, etc.) of a different system, for example, even of a personal computer.

While at present, conventional security measures concerning software security normally relate to a source code or other variants, such as binary code of application programs, the present invention takes into account possible manipulations of standard libraries and runtime environments and their detection.

The present invention can be used highly flexibly and in accordance with demand. For example, a software developer, who develops computer program CP, can determine which calls and/or program functions PF are to be protected by use of the principle of the present invention. For example, in some specific embodiments, it is conceivable for less important program functions not to be protected by the principle of the present invention, while more important program functions are protected. According to other example embodiments, a dynamic determination of when the present invention is used is also conceivable, for example, during the run time of computer program CP, e.g., as a function of one or more operating parameters of computer program CP or of processing unit 100. For example, it can be provided that in some example embodiments, the protection of the present invention always be intended for certain function calls, if the processing unit is integrated in a particular target system, which can be detected, for example, on the basis of communication patterns or other operating parameters of processing unit 100.

Particularly advantageously, the use of the present invention involves comparatively little additional expenditure, in particular, with regard to the execution time of computer program CP, since efficient commands and mechanisms for accurate time measurement, such as precision timers, are often already integrated in current processing units 100. The programming expenditure is comparatively low, as well, cf. Listings 1, 2 described above by way of example.

In addition, the present invention can also be utilized efficiently if the runtime environment and/or the program library or libraries change. In this case, only appropriately updated, measured values and/or setpoint values for the execution time need to be provided.

Listing 1:

```
1 #include <stdio.h>
2 #include <stdint.h>
3 #include <string.h>
4 #include <algorithm>
5 #include <numeric>
6 #include <vector>
7 using namespace std;
8
9 // timer function is taken from:
10 // http://stackoverflow.com/questions/459691/best-timing-method-in-c
11 inline uint64_t rdtsc( ){
12 uint32_t lo, hi;
13 __asm__volatile__(
14 "xorl %%eax, %%eax\n"
15 "cpuid\n"
16 "rdtsc\n"
17 : "=a" (lo), "=d" (hi)
18 :
19 : "%ebx", "%ecx");
20 return (uint64_t)hi << 32|lo;
21 }
22
23 #define START( )\
24 uint32_t tStart = rdtsc( );
25
26 #define STOP( )\
27 uint32_t tEnd = rdtsc( );\
28 printf("%d,", tEnd - tStart);
29
30 int main( ){
31 int i=0;
32 vector<uint32_t> vecReal; // holds all the times for the real function
33 vector<uint32_t>::iterator tIter;
34 uint32_t uiRealFoo = 0;
35
36 // measure the real libc function
37 printf(">> The fopen calls:\n");
38 for (i=0;i<20;i++)
39 {
40 START( );
41 fopen("doesnotexist", "rb");
42 STOP( );
43 vecReal.push_back( tEnd - tStart );
44 }
45
46 // now remove the 5 highest and the 5 lowest values
47 printf("\nremove the 5 max/5 min:\n ");
48 for (i=0;i<5;i++){
49 tIter = max_element(vecReal.begin( ),vecReal.end( ));
50 printf("+%d,",*tIter);
51 vecReal.erase(tIter);
52 tIter = min_element(vecReal.begin( ),vecReal.end( ));
53 printf("-%d,",*tIter);
54 vecReal.erase(tIter);
55 }
56 uiRealFoo = accumulate(vecReal.begin( ),vecReal.end( ),0);
57 printf("\n\n>> Summary:\n");
58 printf(" real sum = %d\n", uiRealFoo);
59 // on my specific machine 170000 seems to be a good value
60 if ( uiRealFoo > 170000 ){
61 printf(">>> It seems that i am hacked :-(\n");
62 }else{
63 printf(">>> Everything seems to be OK\n");
64 }
65 }
```

Listing 2:

```
1 #include <stdio.h>
2 #include <stdint.h>
3 #include <string.h>
4 #include <algorithm>
5 #include <numeric>
6 #include <vector>
7 using namespace std;
8
9 inline uint64_t rdtsc( ){
10 uint32_t lo, hi;
11 __asm__volatile__(
12 "xorl %%eax, %%eax\n"
13 "cpuid\n"
14 "rdtsc\n"
15 : "=a" (lo), "=d" (hi)
16 :
17 : "%ebx", "%ecx");
18 return (uint64_t)hi << 32|lo;
19 }
20
```

-continued

```
21 int internal_strcmp(const char *egg1, const char *egg2){
22   while ( *egg1 == *egg2 ){
23     egg1++;
24     egg2++;
25     if (! (*egg1) ) return 0;
26   }
27   // return value not relevant for the timing
28   return 0;
29 }
30 31 #define START( ) \
32   uint32_t tStart = rdtsc( );
33
34 #define STOP( ) \
35   uint32_t tEnd = rdtsc( ); \
36   printf( "%d,", tEnd - tStart);
37
38 int main( ){
39   int i=0;
40   vector<uint32_t> vecReal; // holds all the times for the real function
41   vector<uint32_t> vecFake; // holds all the times fot the fake function
42   vector<uint32_t>::iterator tIter;
43
44   uint32_t uiRealFoo = 0;
45   uint32_t uiFakeFoo = 0;
46
47   // measure the real libc function
48   printf("» The real strcmp:\n");
49   for (i=0;i<20;i++){
50     START( );
51     strcmp("1234567890", "1234567890");
52     STOP( );
53     vecReal.push_back(tEnd - tStart);
54   }
55
56   // now remove the 5 highest and the 5 lowest values
57   printf("\nremove the 5 max/5 min:\n ");
58   for (i=0;i<5;i++){
59     tIter = max_element(vecReal.begin( ),vecReal.end( ));
60     printf("+%d,",*tIter);
61     vecReal.erase(tIter);
62     tIter = min_element(vecReal.begin( ),vecReal.end( ));
63     printf("-%d,",*tIter);
64     vecReal.erase(tIter);
65   }
66   uiRealFoo = accumulate(vecReal.begin( ),vecReal.end( ),0);
67
68   // measure the internal compare function
69   printf("\n\n>> The internal compare strcmp:\n");
70   for (i=0;i<20;i++)
71   {
72     START( );
73     internal_strcmp("1234567890", "1234567890");
74     STOP( );
75     vecFake.push_back(tEnd - tStart);
76   }
77   // now remove the 5 highest and the 5 lowest values
78   printf("\nremove the 5 max/5 min:\n");
79   for (i=0;i<5;i++){
80     tIter = max_element(vecFake.begin( ),vecFake.end( ));
81     printf("+%d,",*tIter);
82     vecFake.erase(tIter);
83     tIter = min_element(vecFake.begin( ),vecFake.end( ));
84     printf("-%d,",*tIter);
85     vecFake.erase(tIter);
86   }
87   uiFakeFoo = accumulate(vecFake.begin( ),vecFake.end( ),0);
88
89   printf("\n\n>> Summary:\n");
90   printf(" real sum = %d\n", uiRealFoo);
91   printf(" fake sum = %d\n", uiFakeFoo);
92   uint32_t delta = max(uiFakeFoo,uiRealFoo) - min(uiFakeFoo,uiRealFoo);
93   printf(" delta = %d\n", delta);
94   float percentage = ((float)delta) / ((float)uiFakeFoo) * 10.0;
95   printf(" percent = %f\n\n",percentage);
96   if (percentage>1.5){
97     printf(">>> I AM HOOKED ! :-( )\n");
98   }else{
99     printf(">>> everything's OK :-)\n");
100  }
101 }
```

What is claimed is:

1. A processing unit comprising circuitry that is configured to:
receive, by the processing unit from a device separate from the processing unit, (i) determined information characterizing an expected execution time of a program function of a computer program, and/or (ii) information derived from the determined information; wherein the determined information characterizing the expected execution time is determined, by the device, by executing the program function on a reference target system, the reference target system being a completely separate device from a second device encompassing the processing unit;
form a setpoint execution time for execution of the program function using: the received determined information characterizing the expected execution time and/or the information derived from the determined information;
execute, by the processing unit, the program function;
determine, by the processing unit, an execution time during which the program function was executed by the processing unit;
compare, by the processing unit, the determined execution time to the setpoint execution time for execution of the program function; and
carry out, by the processing unit, an error response in response to a difference, determined as a result of the comparison, between the determined execution time and the setpoint execution time;
wherein the processing unit and the reference target system are identical to each other with regard to their hardware;
wherein the processing unit is integrated in a motor vehicle, and the processing unit receives, prior to the integration, (i) the determined information characterizing an expected execution time of a program function of a computer program, and/or (ii) information derived from the determined information.

2. The processing unit of claim 1, wherein the carrying out of the error response in response to the difference is conditional upon that the difference is at least a predefined differential value.

3. The processing unit of claim 1, wherein the error response includes at least one of processing specifiable dummy data and informing another unit about an irregular execution time of the program function.

4. The processing unit of claim 1, wherein the processing unit is configured to execute the program function several times and to ascertain, based on the several times of execution of the program function, at least one of a minimum execution time, a maximum execution time, and, a mean execution time.

5. A method comprising:
receiving, by a processing unit from a device separate from the processing unit, (i) determined information characterizing an expected execution time of a program function of a computer program, and/or (ii) information derived from the determined information, the determined information characterizing the expected execution time being determined, by the device, by executing the program function on a reference target system, the reference target system being a completely separate device from a second device encompassing the processing unit;

forming a setpoint execution time for execution of the program function using: the received determined information characterizing the expected execution time and/or the information derived from the determined information;

executing, by the processing unit, the program function;

determining, by the processing unit, an execution time during which the program function was executed by the processing unit;

comparing, by the processing unit, the determined execution time to the setpoint execution time for execution of the program function; and carrying out, by the processing unit, an error response in response to a difference, determined as a result of the comparison, between the determined execution time and the setpoint execution time;

wherein the processing unit and the reference target system are identical to each other with regard to their hardware;

integrating the processing unit in a motor vehicle;

wherein the receiving step occurs prior to the integrating step.

6. A method comprising:

executing a program function of a computer program on a reference target system, the program function being executable on a target system, the reference target system being a completely separate device from a second device encompassing the target system;

determining, by a device, information characterizing an expected execution time of the program function on the target system based on the executing of the provided program function on the reference target system, wherein the device is separate from the target system;

storing, by the device, the determined information characterizing the expected execution time and/or information derived from the determined information; and transmitting, by the device to the target system, the determined information characterizing the expected execution time;

wherein the target system and the reference target system are identical to each other with regard to their hardware;

wherein the target system is integrated in a motor vehicle, and wherein the transmitting step occurs before the target system is integrated in the motor vehicle.

7. The method as recited in claim 6, further comprising:

receiving, from the device by the target system, the transmitted determined information characterizing the execution time;

forming a setpoint execution time for execution of the program function using the received determined information characterizing the expected execution time;

executing, by the target system, the program function;

determining, by the target system, an execution time during which the program function was executed by the target system;

comparing, by the target system, the determined execution time to the setpoint execution time for execution of the program function; and carry out, by the target system, an error response in response to a difference, determined as a result of the comparison, between the determined execution time and the setpoint execution time.

8. A device comprising circuitry and a data storage, wherein the circuitry is configured to:

execute a program function of a computer program on a reference target system, the program function being executable on a target system, the reference target system being completely a separate device from a second device encompassing the target system;

determine, by the device, information characterizing an expected execution time of the program function on a target system based on the execution of the program function on the reference target system, the device being separate from the target system;

store, by the device, in the data storage the determined information characterizing the execution time and/or information derived from the determined information; and transmit, by the device to the target system, the determined information characterizing the execution time;

wherein the target system and the reference target system are identical to each other with regard to their hardware;

wherein the target system is integrated in a motor vehicle, and wherein the transmission occurs before the target system is integrated in the motor vehicle.

* * * * *